United States Patent
Kang et al.

(10) Patent No.: US 8,400,668 B2
(45) Date of Patent: *Mar. 19, 2013

(54) APPARATUS AND METHOD OF SCANNING AND/OR PRINTING AN IMAGE

(75) Inventors: Hyung-jong Kang, Seoul (KR); Jung-soo Seo, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,747

(22) Filed: Aug. 11, 2011

(65) Prior Publication Data

US 2011/0292430 A1 Dec. 1, 2011

Related U.S. Application Data

(63) Continuation of application No. 10/673,207, filed on Sep. 30, 2003, now Pat. No. 8,027,054.

(30) Foreign Application Priority Data

Oct. 31, 2002 (KR) ................................. 2002-67106
Sep. 2, 2003 (KR) ................................. 2003-61056

(51) Int. Cl.
- *H04N 1/00* (2006.01)
- *H04N 5/76* (2006.01)
- *H04N 5/225* (2006.01)
- *G06F 3/12* (2006.01)
- *G06F 3/00* (2006.01)
- *G06K 15/00* (2006.01)
- *G11C 29/00* (2006.01)

(52) U.S. Cl. ........ 358/1.16; 358/1.6; 358/1.13; 358/1.1; 358/1.15; 358/1.18; 348/231.7; 348/231.99; 348/373; 710/5; 710/36; 710/40; 714/718

(58) Field of Classification Search ................. 358/1.16, 358/1.6, 1.15; 348/231.7; 710/5, 36, 40; 714/718

See application file for complete search history.

(56) References Cited

U.S. PATENT DOCUMENTS

| | | | | |
|---|---|---|---|---|
| 6,498,658 | B1 * | 12/2002 | Sekikawa | 358/1.16 |
| 6,711,626 | B1 * | 3/2004 | Okada | 710/5 |
| 6,947,171 | B1 * | 9/2005 | Narusawa et al. | 358/1.6 |
| 7,027,172 | B1 * | 4/2006 | Parulski et al. | 358/1.15 |
| 7,068,387 | B2 * | 6/2006 | Ahne et al. | 358/1.15 |
| 7,283,274 | B2 * | 10/2007 | Sharma | 358/1.18 |
| 7,733,387 | B1 * | 6/2010 | Misawa | 348/231.7 |
| 2003/0043417 | A1 * | 3/2003 | Oak | 358/402 |

\* cited by examiner

FOREIGN PATENT DOCUMENTS

JP 2002-10025 1/2002

OTHER PUBLICATIONS

KR Office Action dated Sep. 23, 2005, for KR 2003-0061056.

*Primary Examiner* — Akwasi M Sarpong
(74) *Attorney, Agent, or Firm* — Stanzione & Kim, LLP

(57) ABSTRACT

A scanning apparatus and a method thereof include a scanning unit scanning a document and outputting a scanned result, at least one external storage unit detachably attached to the apparatus, at least one internal storage unit, and a controller detecting an attachment state of the external storage unit and storing the scanned result in one of the external storage unit and the internal storage unit according to the attachment state of the external storage unit. The scanning unit of the scanning apparatus is combined with a user scanning unit and a user printing unit into a combination apparatus, and the scanned result is printed in a printing apparatus spaced-apart from the scanning apparatus by a distance, thereby removing cables between the scanning or printing apparatus and a personal computer. Regardless of an attachment state of the external storage unit, the document is scanned in the real time, and the scanning apparatus is commonly used with a plurality of personal computers which are not connected to the scanning apparatus.

15 Claims, 6 Drawing Sheets

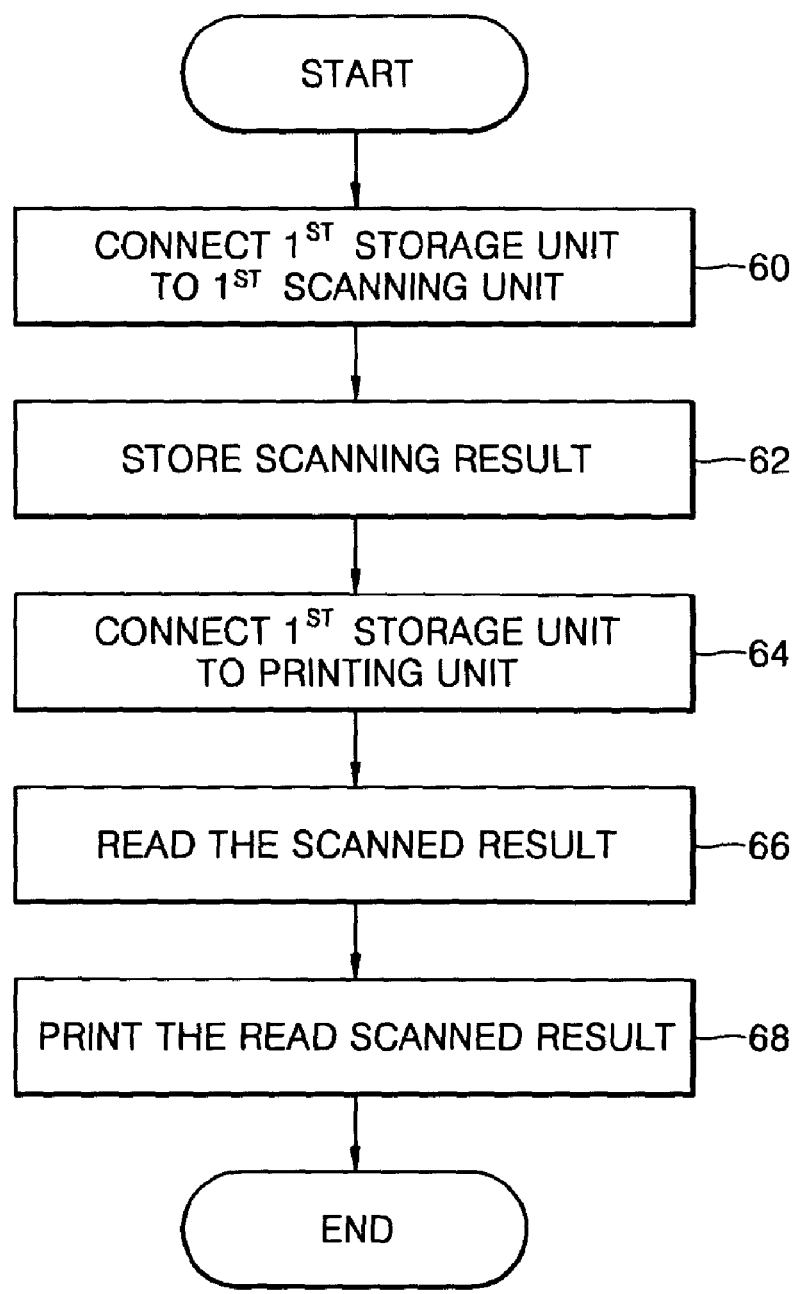

APPARATUS AND METHOD OF SCANNING AND/OR PRINTING AN IMAGE

CROSS-REFERENCE TO RELATED APPLICATIONS

This application is a continuation application of Ser. No. 10/673,207 filed Sep. 30, 2003 now U.S. Pat. No. 8,027,054 in the U.S. Patent and Trademark Office, which claims the benefit of Korean Patent Application Nos. 10-2002-0067106 and 10-2003-0061056 filed with the Korea Industrial Property Office on Oct. 31, 2002 and Sep. 2, 2003, respectively, the disclosures of which are incorporated herein by reference.

QBACKGROUND OF THE INVENTION

1. Field of the Invention

The invention relates to a scanner and a printer, or an apparatus combined with a scanner to provide a scanning function, and particularly to, an apparatus and a method of scanning an image and/or printing the scanned image.

2. Description of the Related Art

According to a conventional scanning/printing method, a user operates a scanning application program in a personal computer (not shown). After a scanner (not shown) is connected to the personal computer, a scanning operation of scanning a document (image or data) is performed, and the scanned document (scanned image or scanned result) is stored in a hard disk (not shown) of the personal computer.

When the document is scanned according to the conventional scanning method, the scanner and the personal computer should be physically connected through a parallel cable or a universal serial bus (USB) cable, and the scanned document should be stored in the hard disk of the personal computer. In a case that a plurality of personal computers are not connected to the scanner through a network, it is impossible to perform the scanning operation in the personal computer which is not connected to the scanner, since the scanning of the document is possible in only the computer connected to the scanner Since a user cannot scan the document using the personal computer which is not connected to the scanner, the user should use the computer connected to the scanner to store the scanned document in a storage medium and then connect the storage medium to the personal computer which is not connected to the scanner. Moreover, due to the cables connected between the scanner and the personal computers used to perform the scanning of the document, surroundings are not neat. Furthermore, manufacturing costs increase, and the increased manufacturing costs are shifted to the user.

According to the conventional scanning/printing method, after the scanned document is stored in the storage medium, the user needs to detach the scanner from the computer to connect a printer to the computer in order to print the scanned document stored in the storage medium.

When the parallel or universal serial bus (USB) cable or a USB hub is used as the cable to connect the scanner or the printer to the computer, the user may not have to detach the scanner or the printer from the computer. In this case, the scanned document can be printed through the printer connected to the computer using a printing function of a scanning application program according to the conventional scanning/printing method.

However, in order to perform the scanning/printing of the document, the scanning/printing application program should be operated in the computer for the scanning operation and the printing operation according to the conventional scanning/printing method. Therefore, there are problems in that the document cannot be scanned or printed without operating the computer.

SUMMARY OF THE INVENTION

In order to solve the above and/or other problems, it is an aspect of the present invention to provide a scanning and/or printing apparatus to scan a document (image or data) or print the scanned document without connecting a scanner/printer to a computer.

It is another aspect of the present invention to provide a scanning and/or printing method to scan a document (image or data) or print the scanned document without connecting a scanner/printer to a computer.

Additional aspects and advantages of the invention will be set forth in part in the description which follows and, in part, will be obvious from the description, or may be learned by practice of the invention.

In order achieve the above and/or other aspects of the present invention, there is provided a scanning and/or printing apparatus including a scanning unit scanning a document and outputting a scanned result, a storage unit storing the scanned result inputted from the scanning unit, and a printing unit reading the scanned result from the storage unit to print the scanned result, wherein the storage unit is selectively connected to one of the scanning unit and the printing unit.

According to another aspect of the present invention, a scanning and/or printing apparatus includes a scanning/printing unit scanning a document and printing the scanned result, and a plurality of storage units storing the scanned result inputted from the scanning/printing unit, wherein the scanning/printing unit prints the scanned result read from the storage units.

According to another aspect of the present invention, a scanning apparatus includes a scanning unit scanning a document and outputting a scanned result, at least one external storage unit detachably attached to the apparatus, at least one internal storage unit, and a controller detecting an attachment state of the external storage unit, and storing the scanned result in one of the external storage unit and the internal storage unit according to the attachment state of the external storage unit.

In order achieve the above and/or other aspects of the present invention, there is provided a method of scanning and/or printing using the scanning and/or printing apparatus of the above embodiment of the present invention, the method including causing a storage unit to be connected to a scanning unit scanning a document and outputting a scanned result, storing the scanned result inputted from the scanning unit into the storage unit, causing the storage unit to be connected to a printing unit reading the scanned result from the storage unit, and printing the scanned result read from the storage unit in the printing unit.

According to another aspect of the present invention, a method of scanning and/or printing using the scanning and/or printing apparatus of the above embodiment of the present invention includes scanning a document in a scanning/printing unit, storing a scanned result in a plurality of storage units, reading the scanned result from the storage units, and printing the scanned result read from the storage unit.

According to another aspect of the present invention, a method of scanning and/or printing using the scanning apparatus of an embodiment of the present invention includes scanning a document and outputting a scanned result in a scanning unit, causing an internal storage unit to be disposed inside the scanning apparatus and an external storage unit to be detachably attached to the scanning apparatus, detecting an attachment state of the external storage unit to the scanning apparatus, storing the scanned result in the external storage unit according to the attachment state in which the external storage unit is attached to the scanning apparatus, and storing the scanned result in the internal storage unit according to the attachment state in which the external storage unit is not attached to the scanning apparatus.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIG. 2 is a flow chart showing a method of scanning and/or printing using the scanning and/or printing apparatus shown in FIGS. 1A and 1B;

DETAILED DESCRIPTION OF THE PREFERRED EMBODIMENTS

Figure 1A:
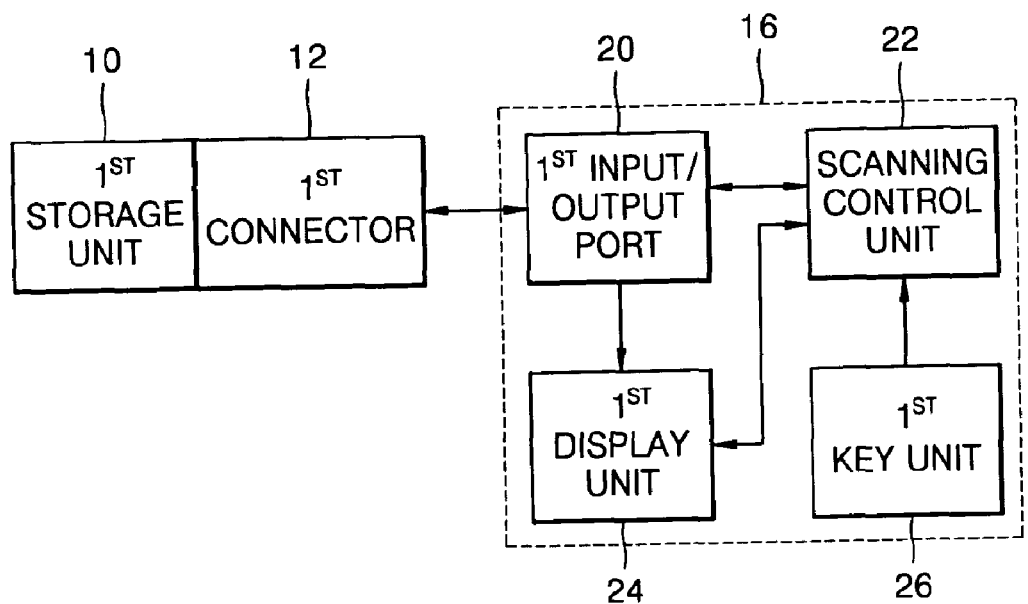
FIGS. 1A and 1B are block diagrams showing a scanning and/or printing apparatus according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Hereinafter, a scanning and/or printing apparatus and a method thereof will be explained with reference to FIGS. 1 through 7.

Figure 1B:
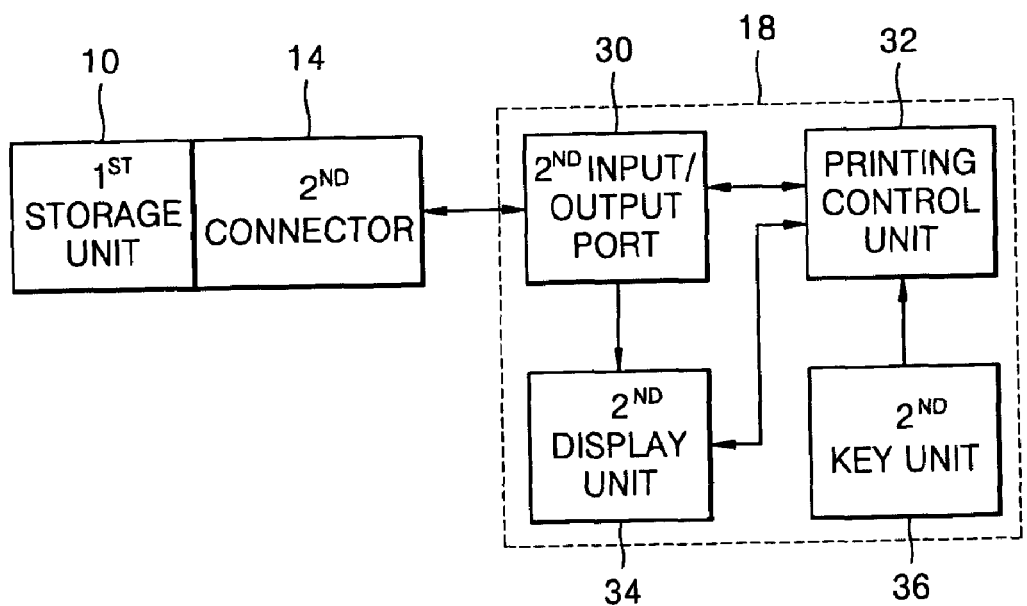

FIGS. 1A and 1B are block diagrams showing the scanning and/or printing apparatus according to an embodiment of the present invention. Referring to FIGS. 1A and 1B, the scanning and/or printing apparatus includes a first storage unit 10, first and second connectors 12 and 14, a first scanning unit 16, and a printing unit 18.

The first scanning unit 16 includes a scanner scanning a document (image or data) to output the scanned result (scanned document, scanned image, scanned data) to the first storage unit 10. The scanned result is inputted to and stored in the first storage unit 10. The printing unit 18 includes a printer printing the scanned result which is read from the first storage unit 10. The first storage unit 10 is selectively detached from the first scanning unit 16 and attached to the printing unit 18 or detached from the printing unit 18 and attached to the first scanning unit 16. The first storage unit 10 is connected to the first scanning unit 16 to store the scanned result, and is detached from the first scanning unit 16 to be attached to the printing unit 18 to print the scanned result.

The scanning and/or printing apparatus further includes the first and second connectors 12 and 14. The first storage unit 10 is connected to the first scanning unit 16 through the first connector 12 and is connected to the printing unit 18 through the second connector 14.

The first scanning unit 16 includes a first input/output port 20, a scanning control unit 22, a first display unit 24, and a first key unit 26. Alternatively, the first scanning unit 16 may not include at least one of the first display unit 24 and the first key unit which are shown in FIG. 1A. The scanning control unit 22 outputs the scanning result to the first storage unit 10 through the first input/output port 20 and the first connector 12. The first display unit 24 displays the scanning result according to a first control signal inputted from the scanning control unit 22. A liquid crystal display (LCD) panel can be used as the first display unit 24. The scanning result displayed on the first display unit 24 may be read and inputted from the first storage unit 10 through the first input/output port 20, or inputted from the scanning control unit 22. The first key unit 26 generates a first searching signal, a first deleting signal, and a first selecting signal according to a user manipulation, and the generated first searching, deleting, and selecting signals are outputted to the scanning control unit 22. The scanning control unit 22 generates the first control signal to scroll the scanned result displayed on the first display unit 24 according to the first searching signal of the first key unit 26 to delete the scanned result according to the first deleting signal of the first key unit 26, and to select the scanned result according to the first selecting signal of the first key unit 26.

For example, when a plurality of scanned results are stored in the first storage unit 10 connected through the first connector 12, the scanned results may be displayed on the first display unit 24. The user may select, search, and delete one of the scanned results using the first key unit 26 while watching the scanned results displayed on the first display unit 24.

The printing unit 18 includes a second input/output port 30, a printing control unit 32, a second display unit 34, and a second key unit 36. Alternatively, the printing unit 18 may not include at least one of the second display unit 34 and the second key unit 36 which are shown in FIG. 1B. The printing control unit 32 prints the scanned result, which is inputted from the first storage unit 10 through the second connector 14 and the second input/output port 30. Here, the second display unit 34 displays the scanning result which is read and inputted from the first storage unit 10 through the second connector 14 and the second input/output port 30, according to a second control signal inputted from the printing control unit 32. The LCD panel may be used as the second display unit 34. The second key unit 36 generates a second searching signal, a second deleting signal, and a second selecting signal according to the user manipulation, and the generated second searching, deleting, and selecting signals are outputted to the printing control unit 32. The printing control unit 22 generates the second control signal to scroll the scanned result displayed on the second display unit 34 according to the second searching signal of the second key unit 36 to delete the scanned result according to the second deleting signal of the second key unit 36, and to select the scanned result according to the second selecting signal of the second key unit 36.

For example, when a plurality of scanned results are stored in the first storage unit 10 connected through the first connector 12, the scanned results stored in the first storage unit 10 may be displayed on the second display unit 24. The user may select, search, and delete at least one of the scanned results using the second key unit 36 while watching the scanned results displayed on the second display unit 24.

In a case that the first storage unit 10, as shown in FIG. 1A or 1B, is a universal serial bus (USB) flash memory stick, a USB input/output connector can be used as respective ones of the first and second connectors 12, 14, and a USB input/output port can be used as the first and second input/output ports 20, 30. Since the first and second connectors 12, 14 have different structures for the personal computer-connecting purpose and for peripheral-connecting purpose regarding the shape, the first and second connectors may have a structure on which a basic USB connector for the personal computer-connecting purpose is detachably combined with a connector for the peripheral-connecting purpose.

A scanning and/or printing method performed using the scanning and/or printing apparatus of FIGS. 1A and 1B will be explained hereinafter with reference to FIGS. 1A, 1B, and 2.

FIG. 2 is a flow chart showing the method of scanning and/or printing using the scanning and/or printing apparatus shown in FIGS. 1A and 1B. The method includes operations 60 through 62 of scanning the document and storing the scanned result, and operations 64 through 68 of reading and printing the scanned result.

The first storage unit 10 is connected to the first scanning unit 16 to store the scanned result in operation 60. That is, the first storage unit 10 and the first scanning unit 16 are connected to each other through the first connector 12.

The first scanning unit 16 stores the scanned result in the first storage unit 10 in operation 62. The scanning control unit 22 transmits the scanned result to the first storage unit 10 through the first input/output port 20 and the first connector 12 to store the scanned result in the first storage unit 10.

The first storage unit 10 storing the scanned result is connected to the printing unit 18 in operation 64. That is, the first storage unit 10 and the printing unit 18 are connected to each other through the second connector 14.

The printing control unit 32 reads the scanned result from the first storage unit 10 in operation 66, and the printing control unit 32 prints the read scanned result in operation 68.

Hereinafter, another embodiment of the scanning and/or printing apparatus will be explained with reference to the drawings.

Figure 3:
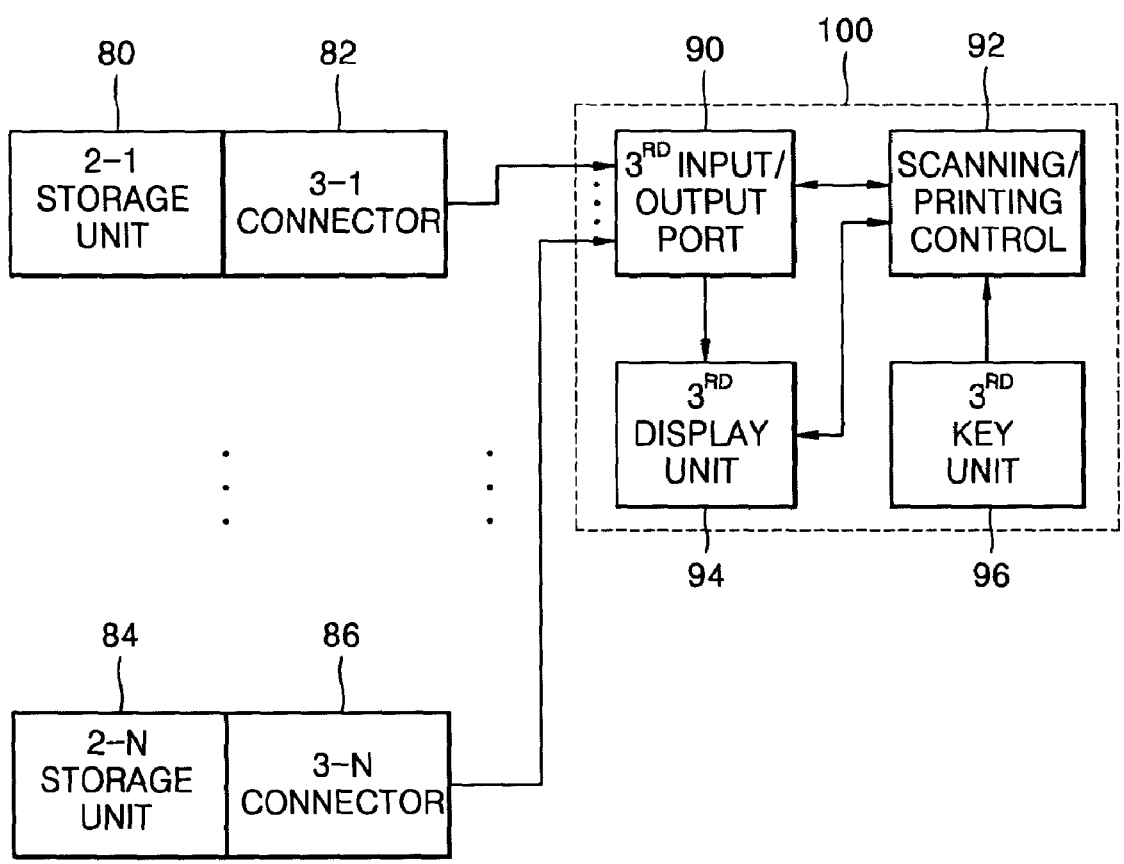
FIG. 3 is a block diagram showing a scanning and/or printing apparatus according to another embodiment of the present invention.

FIG. 3 is a block diagram showing a scanning and/or printing apparatus according to another embodiment of the present invention. Referring to FIG. 3, the scanning and/or printing apparatus of this embodiment includes 2-1, . . . , 2-N storage units 80, 84, 3-1, . . . , 3-N connectors 82, 86, and a scanning and/or printing unit 100. Here, N is a positive integer.

The scanning and/or printing unit 100 includes a scanner to scan the document and outputs the scanned result to the 2-1, . . . , 2-N storage units 80, 84. The 2-1, . . . , 2-N storage units 80, 84 stores the scanned result inputted from the scanning and/or printing unit 100. The scanning and/or printing unit 100 may have a printer to print the scanned result read from a 2-$n$ storage unit (1<n<N) 80 or 84.

The scanning and/or printing unit 100 further includes the 3-1, . . . , 3-N connectors 82, 86 to connect respective ones of the 2-1, . . . , 2-N storage units 80, 84 to the scanning and/or printing unit 100 through corresponding ones of the 3-1, . . . , 3-N connectors 82, 86.

The scanning and/or printing unit 100 includes a third input/output port 90, a scanning and/or printing control unit 92, a third display 94, and a third key unit 96. The scanning and/or printing unit 100 may not includes at least one of the third display unit 94 and the third key unit 96. The scanning and/or printing control unit 92 transmits the scanned result to one or the respective ones of the 2-1, . . . , 2-N storage units 80, 84 through the third input/output port 90 and the corresponding ones of the 3-1, . . . , 3-N connectors 82, 86. The scanning and/or printing control unit 92 prints the canned result read and inputted from the one or the respective ones of the 2-1, . . . , 2-N storage units 80, 84 through the corresponding ones of the 3-1, . . . , 3-connectors 82, 86 and the third input/output port 90.

The third display unit 94 displays the scanned result according to a third control signal inputted from the scanning/printing control unit 92. The third display unit 94 also displays the scanned result read and inputted from one of the respective ones of the 2-1, . . . , 2-N storage units 80, 84 through the corresponding ones of the 3-1, . . . , 3-N connectors 82, 86 and the third input/output port 90 according to a fourth control signal inputted from the scanning/printing control unit 92. The LCD panel can be used as the third display unit 94.

The third key unit 96 generates a third searching signal, a third deleting signal, and a third selecting signal according to the user manipulation, and outputs the third searching, deleting, and selecting signals to the scanning/printing control unit 92. The scanning/printing control unit 92 generates the third and fourth control signals to scroll the scanned results displayed on the third display unit 94 according to the third searching signal inputted from the third key unit 96. The scanning/printing control unit 92 deletes the scanned result in response to the third deleting signal inputted from the third key unit 96, and also selects the scanned result in response to the third selecting signal inputted from the scanning/printing control unit.

The scanned results stored in the 2-1, . . . , 2-N storage units 80, 84 can be displayed on the third display unit 94. The user may select, search, delete at least one of the scanned results using the third key unit 96 while watching the scanned results displayed on the third display unit 94.

The scanned results include a first scanned result corresponding to a first document, a second scanned result corresponding to a second document, and a third scanned result corresponding to a third document. The first, second, third scanned results may be stored in first, second, and third storage units, respectively, according to the third selecting signal. However, the first, second, third scanned results may be stored in one of the first, second, and third storage units, or in each of the first, second, and third storage units according to the third selecting signal. The third display unit may display each or all of the first, second, and third scanned results according to the third selecting signal.

The third input/output port 90 performs all functions of the first and second input/output ports 20, 30 of FIGS. 1A and 1B. The scanning/printing control unit 92 performs all functions of the scanning control unit 22 and the printing control unit 32, the third display unit 94 performs all functions of the first and second display unit 24, 34, and the third key unit 96 performs all functions of the first and second key units 26, 36. If the scanning and/or printing apparatus is an apparatus combined with the printer and the scanner to perform scanning and printing operations, the scanning and/or printing apparatus is realized with the apparatus shown in FIG. 3 rather than the apparatus shown in FIG. 1A or 1B.

Another scanning and printing method performed with the scanning and/or printing apparatus shown in FIG. 3 will be explained with reference to the drawings.

Figure 4:
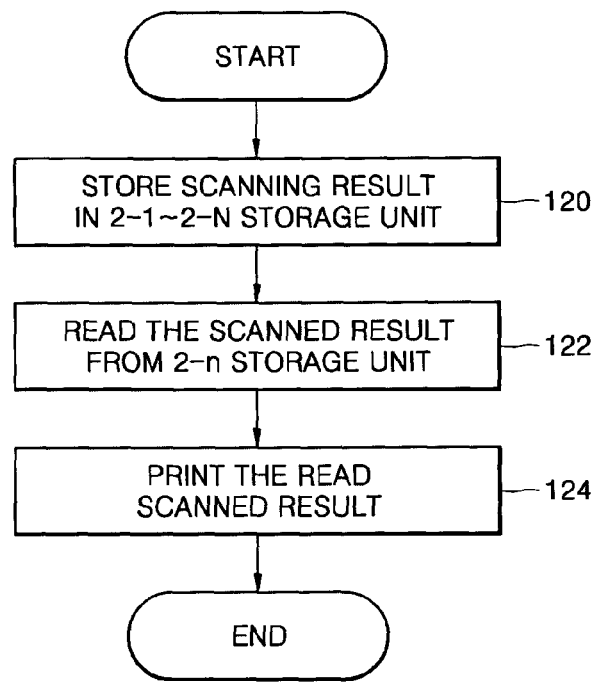
FIG. 4 is a flow chart showing a method of scanning and/or printing using the scanning and/or printing apparatus shown in FIG. 3.

FIG. 4 is a flow chart showing the method performed with the scanning and/or printing apparatus shown in FIG. 3. The method includes an operation 120 of storing the scanned result in the 2-1, . . . , 2-N storage units 80, 84, operations 122 and 124 of reading the scanned result stored in the 2-1, . . . , 2-N storage units 80, 84, and printing the read scanned result.

The scanning/printing control unit 92 stores the scanned result in the 2-1, . . . , 2-N storage units 80, 84 in operation 120.

The scanning/printing control unit 92 reads the scanned result which is stored in the 2-1, ..., 2-N storage units 80, 84, from at least one of the 2-1, ..., 2-N storage units 80, 84 in operation 122. The scanning/printing control unit 92 prints the read scanned result in operation 124.

Hereinafter, another embodiment of the scanning and/or printing apparatus will be explained with reference to FIG. 5.

Figure 5:
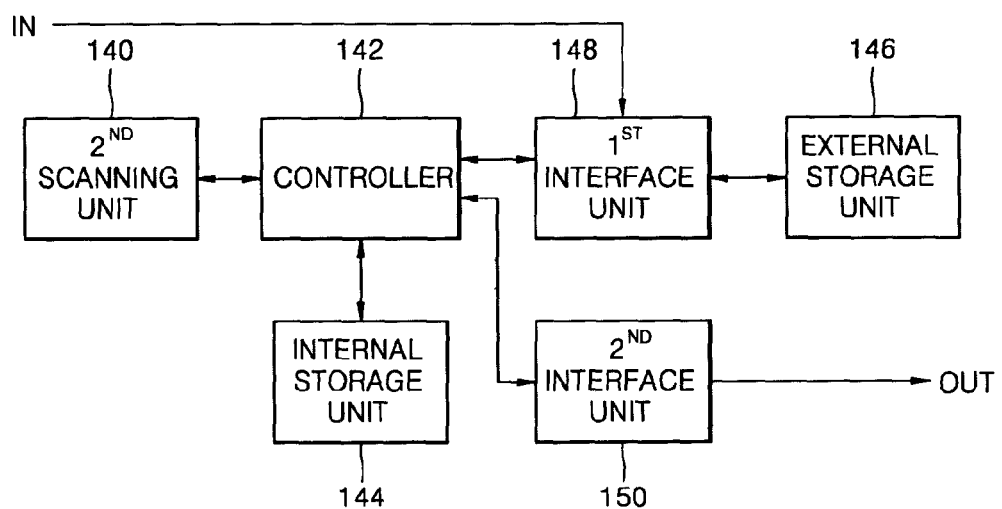
FIG. 5 is a block diagram showing a scanning apparatus according to another embodiment of the present invention.

FIG. 5 is a block diagram showing the scanning apparatus according to another embodiment of the present invention. Referring to FIG. 5, the scanning apparatus includes a second scanning unit 140, a controller 142, an internal storage unit 144, an external storage unit 146, and first and second interface units 148, 150.

The second scanning unit 140 shown in FIG. 5 includes a scanning mechanism to scan the document and to output the scanned result to the controller 142. A charge coupled device (not shown) or a contact image sensor can be used as the second scanning unit 140.

The controller 142 detects whether the external storage unit 146 is attached to the scanning apparatus of FIG. 5, and stores the scanned result inputted from the second scanning unit 140 in at least one of the internal storage unit 144 and the external storage unit 146 upon determining that the external storage unit 146 is attached to the scanning apparatus. A dynamic RAM (not shown) can be used as the internal storage unit 144.

The controller 142 may include a converter to convert an analog signal received from the second scanning unit 140 into a digital signal (the scanned result). Here, the controller 142 may image-processes the scanned result. A image processor which image-processes the scanned result can be included in the controller 142 or can be provided outside the controller 142. The image-processed digital signal can be stored in the internal storage unit 144 or the external storage unit 146 as the scanned result.

The external storage unit 146 is detachably attached to the second scanning unit 140 of FIG. 5. Here, a portable memory, for example, any type of currently used memory, can be used as the external storage unit 146. Also, a memory stick (MS), a compact flash (CF) card, a secure digital (SD) memory card, a multimedia card (MMC), a smart media (SM) card, a universal serial bus (USB) memory card, or an xD-picture card can be used as the external storage unit 146.

The second scanning apparatus of FIG. 5 may be connected to a plurality of external storage units 146. The internal storage unit 144 is mounted in the scanning apparatus of FIG. 5. The controller 142 detects whether the external storage unit 146 is connected to the scanning apparatus, through an attachment/detachment state of the external storage unit 146, stores the scanned result in the external storage unit 146 upon determining that the external storage unit 146 is attached to the scanning apparatus, and stores the scanned result in the internal storage unit 144 upon determining that the external storage unit 146 is not attached to the scanning apparatus.

The scanning apparatus of FIG. 5 is further provided with a first interface unit 148. The first interface unit 148 interfaces the controller 142 with the external storage unit 146.

The scanned result stored in the external storage unit 146 and/or the internal storage unit 144 shown in FIG. 5 can be printed. The external storage unit 146 can be attached (connected) to a device, such as another combination apparatus, another printing unit, another scanning unit, or a personal computer. The scanned result stored in the external storage unit 146 can be printed through the device. Also, the scanned result stored in the internal storage unit 144 can be printed through the controller. When the scanning apparatus further includes the second interface unit 150, the controller 142 outputs the scanned result, read from one of the internal storage unit 144 and the external storage unit 146, to a print engine through the second interface unit 150 and an output terminal OUT. The print engine prints the scanned result inputted from the controller 142 through the second interface unit 150.

The controller 142 receives the scanned result from an external apparatus, such as another scanning apparatus (not shown) or another combination apparatus having a scanner or a printer, through the first interface unit 148 and an input terminal IN. The controller 142 may output through the second interface unit 150 the scanned result, which is received from the external apparatus through the first interface unit 148, to another external apparatus, such as the print engine, or may store the scanned result, which is received from the external apparatus through the first interface unit 148, in the internal storage unit 144 or the external storage unit 146.

The scanning apparatus shown in FIG. 5 may be the combination apparatus performing the scanning operation of scanning the document and the printing operation of printing the scanned result. In this case, the controller 142 controls overall functions of the combination apparatus.

A scanning and printing method performed using the scanning apparatus shown in FIG. 5 according to another embodiment of the present invention will be explained with reference to FIGS. 5, 6, and 7.

Figure 6:
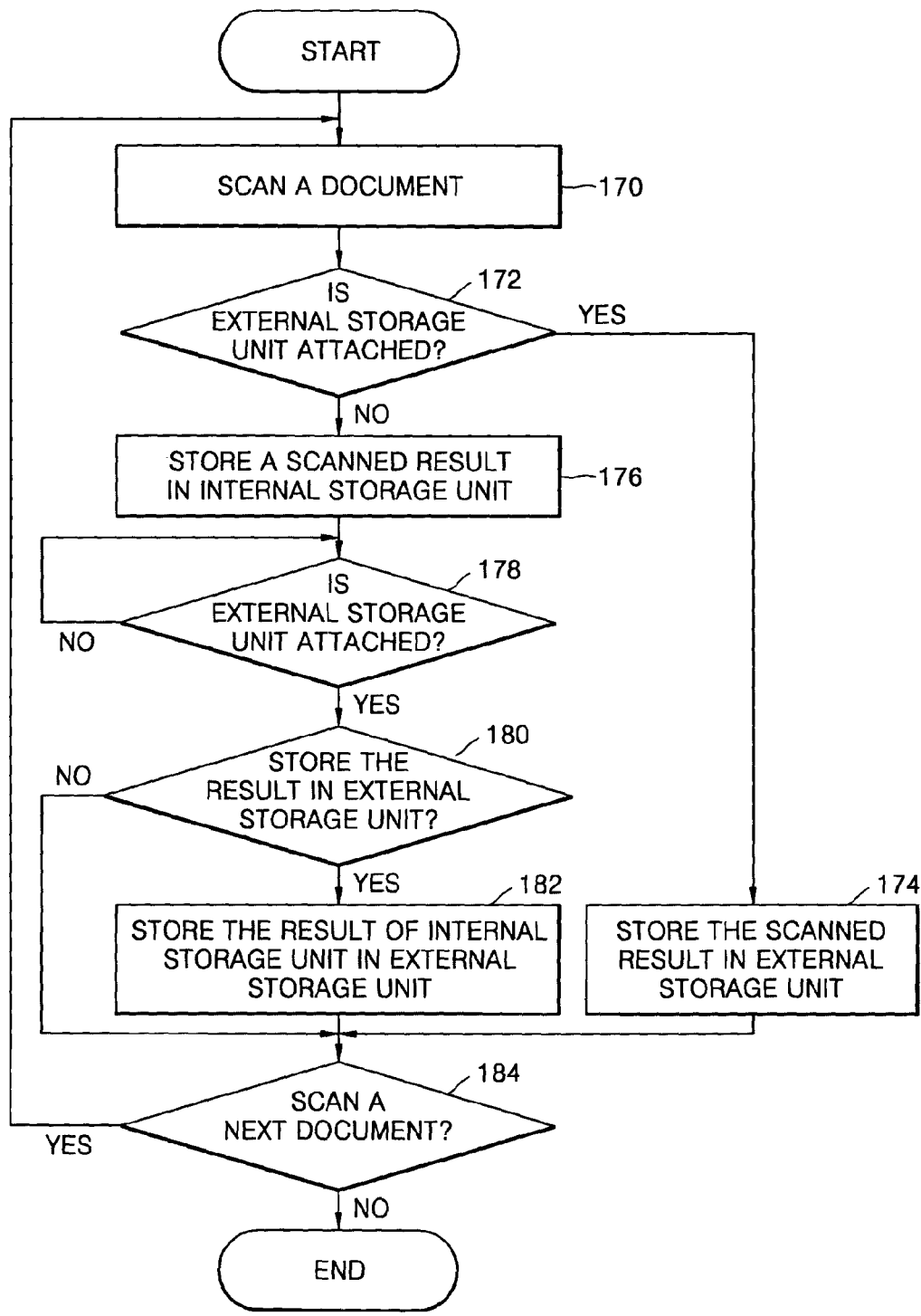
FIG. 6 is a flow chart showing a method of scanning and/or printing using the scanning apparatus shown in FIG. 5.
Figure 7:
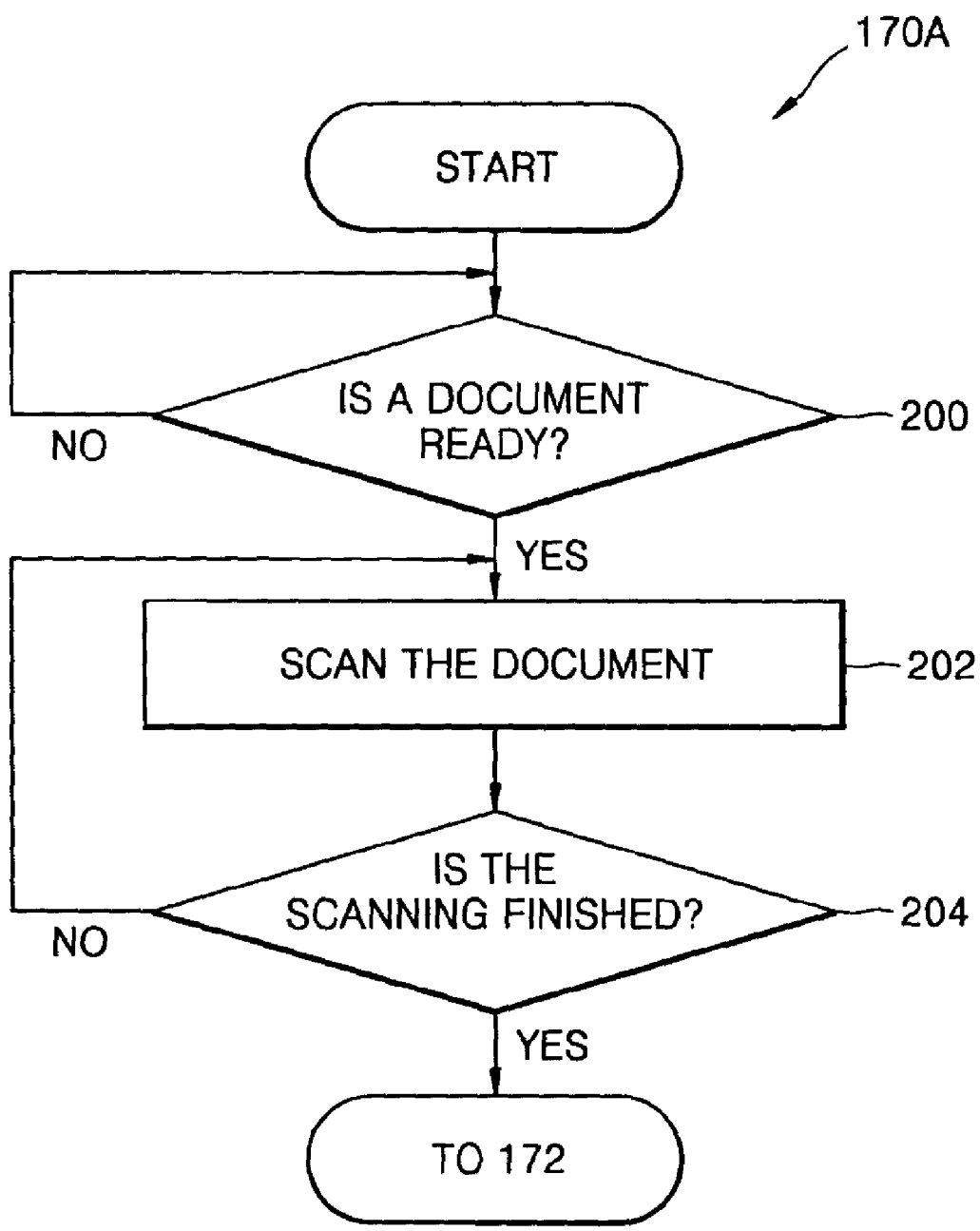
FIG. 7 is a flow chart showing another operation of scanning an image according to the method shown in FIG. 6.

FIG. 6 is a flow chart showing the method performed in the scanning apparatus shown in FIG. 5. The method includes operations 170 through 176 of storing the scanned result in at least one of the internal storage unit 144 and the external storage unit 146, operations 178 through 182 of storing the scanned result, stored in the internal storage unit 144 and read from the internal storage unit 144, in the external storage unit 146 according to the attachment state of the external storage unit 146, and an operation 184 of determining whether a next image (document) is ready to be scanned.

The scanning method of FIG. 6 is performed using the scanning apparatus of FIG. 5 as follows.

The document is scanned in the second scanning unit 140 in operation 170. FIG. 7 is a flow chart showing a detail operation 170A of the operation 170 of FIG. 6. The detail operation 170A includes operations 200 through 204 of scanning the document which is ready to be scanned.

It is determined whether the document to be scanned is ready in the second scanning unit 140 in operation 200. The document is scanned upon determining that the document is ready to be scanned, in operation 202. It is determined whether the scanning of the document is finished, in operation 204. The operation 202 is performed again when the scanning of the document is not finished yet. The operation 172 of FIG. 6 is performed when the scanning of the document is finished.

The controller 142 determines whether the external storage unit 146 is attached to the scanning apparatus of FIG. 5, in operation 172.

When the external storage unit 146 is attached to the scanning apparatus, the controller 142 stores the scanned result in the external storage unit 146 in operation 174. The scanned result, stored in the external storage unit 146, can be a scanned result outputted from the second scanning unit 140 or another scanned result which has been inputted from the input terminal IN and stored in the internal storage unit 144.

When the external storage unit 146 is not attached to the scanning apparatus of FIG. 5, the controller 142 stores the scanned result in the internal storage unit 144 in operation 176. The scanned result, stored in the internal storage unit 144, can be another inputted from the second scanning unit 140 or another scanned result which has been inputted from the input terminal IN and stored in the internal storage unit 144 by the controller 142.

The scanning method selectively includes operations 178 through 184 of FIG. 6 as follows.

Also, the method of the scanning and/or printing apparatus of FIG. 3 may include operations 178 and 182 of the scanning method shown in FIG. 6. In this case, the controller 142 determines whether the external storage unit 146 is attached to the scanning apparatus of FIG. 5, in operation 178. The operation 178 is performed when the external storage unit 146 is not attached to the scanning apparatus of FIG. 5. The controller 142 stores the scanned result, which has been stored in the internal storage unit 144, in the external storage unit 146 in operation 182, when the external storage unit 146 is attached to the scanning apparatus of FIG. 5.

In order to perform operations 172 and 178, the controller 142 may employ a general recognizing method of recognizing the attachment state of a memory which is able to be detachably attached to a personal computer. For example, a plug & plug technology to recognize an attachment of the external storage unit 146 and another technology to recognize the attachment of the external storage unit 146 using a protocol, such as IEEE 1394, can be used as the recognizing method to perform the operations 172 and 178.

The scanning method may further include the operation 180. When the external storage unit 146 is attached to the scanning apparatus of FIG. 5, it is determined whether the scanned result, which has been stored in the internal storage unit 144, should be stored in the external storage unit 146, in operation 180. If the scanned result, which has been stored in the internal storage unit 144, should be stored in the external storage unit 146, the scanned result, which has been stored in the internal storage unit 144, is stored in the external storage unit 146 in operation 182.

Also, the scanning method may further include the operation 184 in addition to the above scanning method. If the scanning method is performed using operations 170 through 176 and 184, it is determined in operation 184 whether a next document should be scanned after operation 174 or 176. If the scanning method is performed using operations 170 through 178, 182, and 184, it is determined in operation 184 whether the next document should be scanned after operation 174 or 182. If the scanning method is performed as shown in FIG. 6, it is determined in operation 184 whether a next document should be scanned after operation 174 or 182 or when it is determined that the scanned result, which has been stored in the internal storage unit 14, should not be stored in the external storage unit 146. If the next document needs to be scanned, operation 170 is performed.

As described above, since the scanning and/or printing apparatus and method of the above embodiments can scan the document and print the scanned result without being connected to the personal computer, the user can use the first scanning unit 16 and the printing unit 18 as the combination apparatus. Even if the first scanning unit 16 and the printing unit 18 are spaced-apart by a distance, the user can scan the document and print the scanned result by moving the first storage unit 10 from the first scanning unit 16 to the printing unit, for example, by detaching the first storage unit 10 storing the scanned result from the first scanning unit 16 and by connecting the first storage unit 10 to the printing unit 18, thereby providing convenience to the user. Since the scanned result is stored in the external storage unit 146 rather than in the hard disk of the personal computer, and the external storage unit 146 is detached from the scanning apparatus to print the scanned result, it is not necessary to provide the cables to connect the scanning apparatus to the personal computer.

Since the scanned result is stored in the internal storage unit 144 while the external storage unit 146 is not connected to the scanning apparatus, the scanned result, stored in the internal storage unit 144, can be stored in the external storage unit 146 later when the external storage unit 146 is attached to the scanning apparatus. Therefore, the document is scanned and the scanned result can be stored in the real time regardless of the attachment (detachment) state of the external storage unit 146 to the scanning apparatus. In a case that the scanner is not connected to a plurality of personal computers, the personal computer, not connected to the scanning apparatus, can obtain the scanned result through the external storage unit 146. Therefore, a single scanning apparatus can be commonly used with the personal computers which are not connected to the scanner, so that the personal computer, which is not connected to the scanning apparatus, can obtain the scanned result through the external storage unit.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image forming device comprising:
a printing unit to print an image on a print medium;
a scanning unit to scan a document to generate scanned data;
a port to removably receive a portable memory unit;
a display unit to display the scanned data;
a control unit operable to control direct and permanent storing of the scanned data in the portable memory unit without via an internal storage unit, wherein when the portable memory unit having the scanned data stored therein is detached from the port and subsequently attached to the port, the control unit is operable to control reading the scanned data from the portable memory unit, to control direct printing of the scanned data read from the portable memory unit via the printing unit without receiving printing instructions from a host computer;
the internal storage unit, wherein the control unit is operable to control direct and permanent storing of the scanned data in the internal storage unit when the portable memory unit is not attached to the port, and the control unit is operable to control reading of the scanned data stored in the internal storage unit and control direct and permanent storing of the scanned data in the portable memory unit when it is determined that the portable memory unit is attached to the port, and
a manipulation unit to receive a user input to select one of a plurality of scanned data files stored in the portable memory unit for direct printing of the selected scanned data file via the printing unit.

2. The image forming device of claim 1, wherein the control unit is operable to control storing of the scanned data in an image data format in the portable memory unit.

3. The image forming device of claim 1, further comprising:
a display unit to display information about a plurality of scanned data files stored in the portable memory unit.

4. The image forming device of claim 1, wherein the port comprises a universal serial bus (USB) port to receive a USB memory unit.

5. The image forming device of claim 1, further comprising a second port adapted to receive a portable storage unit, which is selected from the group consisting of a memory stick (MS), a compact flash (CF) card, a secure digital (SD) memory card, a multimedia card (MMC), a smart media (SM) card, a universal serial bus (USB) memory card, and an xD-picture card.

6. The image forming device of claim 4, further comprising a second port adapted to receive a portable storage unit, which is selected from the group consisting of a memory stick (MS), a compact flash (CF) card, a secure digital (SD) memory card, a multimedia card (MMC), a smart media (SM) card, a universal serial bus (USB) memory card, and an xD-picture card.

7. The image forming device of claim 1, wherein the control unit controls storing the scanned data in a document data format.

8. The image forming device of claim 1, wherein:
the port comprises a plurality of universal serial bus (USB) ports to removably receive a plurality of portable USB memory units, respectively; and
the control unit is operable to control storing of the scanned data in a data format in the plurality of USB portable memory units.

9. The image forming device of claim 1, wherein the control unit is operable to display the scanned data from the portable memory unit.

10. A method for use in an image forming device having a printing unit to print an image on a print medium, a scanning unit to scan a document to generate scanned data, and a port to removably receive a portable memory unit, the method comprising:
detecting an attachment state of the portable memory unit with respect to the port;
scanning a document to generate scanned data;
storing the scanned data in the portable memory unit;
when the portable memory unit having the scanned data stored therein is detached from the port and subsequently attached thereto, reading the scanned data from the portable memory unit and directly printing the scanned data read from the portable memory unit via the printing unit without receiving printing instructions from a host computer,
storing the scanned data in an internal storage unit when the portable memory unit is not attached to the port, and reading the scanned data stored in the internal storage unit and storing the scanned data in the portable memory unit when it is determined that the portable memory unit is attached to the port, and
receiving from a manipulation unit a user input to select one of a plurality of scanned data files stored in the portable memory unit for direct printing of the selected scanned data file via the printing unit.

11. The method of claim 10, further comprising:
storing of the scanned data in an image data format in the portable memory unit.

12. The method of claim 10, further comprising:
displaying information about a plurality of scanned data files stored in the portable memory unit.

13. The method of claim 10, wherein the port comprises a universal serial bus (USB) port to receive a USB memory unit.

14. The method of claim 10, wherein the storing the scanned data comprises:
storing the scanned data in a document data format.

15. The method of claim 10, wherein:
the port comprises a plurality of universal serial bus (USB) ports to removably receive a plurality of portable USB memory units, respectively; and
the storing comprises storing of the scanned data in a data format in the plurality of USB portable memory units.

* * * * *